July 10, 1962 — L. G. SIMJIAN — 3,043,020

TRAINING DEVICE FOR MOTOR VEHICLE

Original Filed Dec. 4, 1957 — 2 Sheets-Sheet 1

INVENTOR.
LUTHER G. SIMJIAN
BY
*Erwin B. Steinberg*
AGENT.

July 10, 1962 L. G. SIMJIAN 3,043,020
TRAINING DEVICE FOR MOTOR VEHICLE
Original Filed Dec. 4, 1957 2 Sheets-Sheet 2

INVENTOR.
LUTHER G. SIMJIAN
BY
*Ervin B. Steinberg*
AGENT.

United States Patent Office 3,043,020
Patented July 10, 1962

3,043,020
TRAINING DEVICE FOR MOTOR VEHICLE
Luther G. Simjian, Greenwich, Conn., assignor to Reflectone Electronics, Inc., Stamford, Conn., a corporation of Connecticut
Original application Dec. 4, 1957, Ser. No. 700,648, now Patent No. 3,013,343, dated Dec. 19, 1961. Divided and this application Mar. 3, 1960, Ser. No. 12,649
11 Claims. (Cl. 35—11)

This application is a divisional application of my co-pending application for U.S. Letters Patent, Serial No. 700,648, entitled "Training Device," filed December 4, 1957, now Patent No. 3,013,343.

This invention generally refers to improvements in training devices and has particular reference to a novel and useful means for training, testing, analyzing and recording the actions and reactions of persons in operating certain control mechanisms. More specifically, the invention is related to a classroom training device adapted to present varying visual stimuli to a trainee position and wherein controls at the trainee position may be used to modify certain programmed sequences.

The invention specifically is directed to providing a novel and useful mechanism for teaching persons the handling of power operated vehicles, such as automobiles, boats, airplanes, etc. While the primary object of this training device is the training and instructing of novices, it will be found that the device is equally useful for evaluating the capability and proficiency of drivers possessing already a certain amount of experience and skill. In this manner, the instant training device, as will be apparent from the following description, constitutes an extremely valuable and versatile tool for the ever increasing demand and need for driver education and evaluation.

The recent rapid increase in moving vehicles and the alarming rise of the accident rate with the resultant loss to human life and property has focussed renewed attention on the problem of driver education and driver evaluation and pointed out the need for an apparatus which in a realistic manner would serve to teach and evaluate a driver in his actions and reactions when operating a power-driven vehicle. Such an apparatus in order to be useful must be suitable in connection with driver teaching classes where either a single or a plurality of students is trained.

Although the prior art shows various trainers of this type, many of the prior art devices known and evaluated exhibit severe shortcomings, such as inadequate realism and lack of realistic presentation with regard to wrong actions by an individual student, specifically when group training is involved.

The instant application discloses a trainer which has been designed to overcome the above mentioned shortcomings by providing realism not only to each single student but by designing the trainer in such a manner that it may be used equally well for group training. The trainer is entirely a self-contained unit which is readily transportable for classroom use. Several trainers in parallel may be used in a single installation without affecting the training value at each single station. To this end, the invention provides a trainer which tests the ability of an individual to handle the vehicle controls under numerous situations, these situations occurring on a programmed or random schedule.

In conformity with the forgeoing, in its present and preferred embodiment the invention provides a trainee position which is equipped with the usual vehicle controls—in the case of an automobile—steering wheel, gear shift, brake, clutch and accelerator pedals. In front of the trainee position there is disposed a small object which represents a portion of the automobile which the trainee is controlling. A terrain presentation, for instance an endless belt, moves relative to the object, the speed of the belt relative to the object and the lateral position of the object relative to the belt are controlled by the trainee. Means are provided to cause a continuously changing road pattern on the belt. It is the trainee's problem to steer the object in such a manner that the boundaries of the roadway on the belt are not exceeded. The longitudinal speed of the belt is adjustable by the instructor and may be influenced still further by the controls at the trainee position.

One of the objects of this invention is therefore the provision of a novel and improved training device which is useful for teaching and evaluating persons in the operation and handling of power driven vehicles.

Another object of this invention is the provision of a self-contained trainer readily operable in single or plural units.

Another object of this invention is the provision of a driving trainer which presents to a student realistic conditions so as to cause the student to acquire driving skill and proficiency.

Another object of this invention is the provision of a vehicle training device in which the actions taken by the student are apparent to the student at once regardless as to whether individual or group training is involved.

A further object of this invention is the provision of a training device which is equipped with means to present variable and varying road patterns to the student.

A further object of this invention is the provision of a driving trainer in which certain characteristics of an actual vehicle are simulated.

Further and still other objects of the instant invention will be apparent from the following description taken in conjunction with the accompanying drawings in which.

Figure 1:
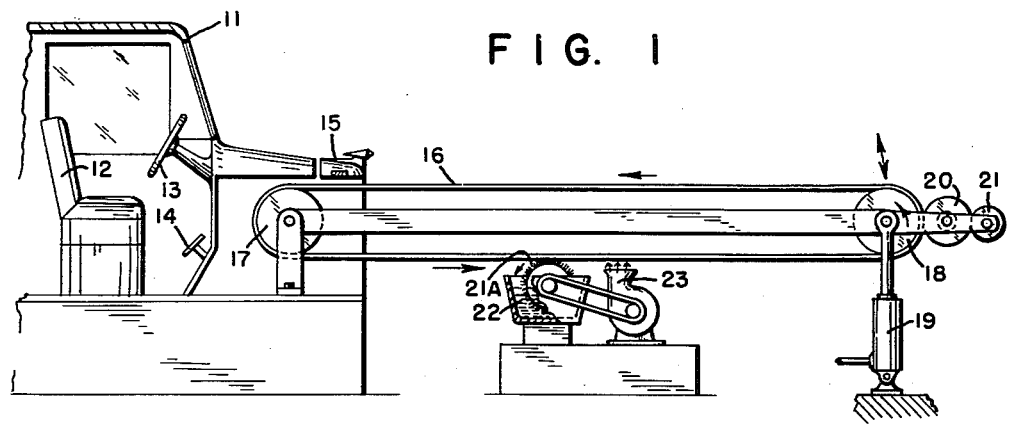
FIGURE 1 is a view in longitudinal section, partly schematic, of the training device.

Referring now to the figures and FIGURE 1 in particular, numeral 11 identifies a trainee position such as the cab of an automobile which is to be occupied by the student. It will be apparent that such a student position may resemble the operator's position on a ship, aircraft, etc. without departing from the scope of the instant invention. Within this cab there will be found a seat 12, a steering wheel 13, and suitable foot pedals 14.

In view of the trainee's position there is disposed a portion of the vehicle such as the front portion of a hood 15 which may include a hood ornament. This hood portion, or object, is distinct from the cab 11 and is movable laterally with respect to a moving endless belt 16 disposed in front and below the object 15. The endless belt 16 represents visual stimulus means in the form of road information and moves longitudinally toward the object 15.

The terrain belt 16 is driven about spaced rollers 17 and 18 at a speed which represents driving speed. The center axis of roller 18 is supported by means of an elevating mechanism, for instance, a hydraulic cylinder 19 so that the belt at the far end (roller 18) may be tilted upward or downward with respect to object 15 and cab 11 to simulate upgrade or downgrade road conditions. The lateral or transverse motion of object 15 relative to the longitudinal axis of belt 16 is controlled from steering wheel 13. One of the objects of this trainer is to impart steering skill to the student. To this end, cooperating with the belt there is a set of marking rollers 20 which receive a suitable marking liquid from a set of ink rollers 21. Each marking roller 20 is in contact with the belt at roller 18 and is used to mark a lateral boundary representing the limit of a roadway on the belt. After the marking has passed object 15, the marking becomes erased by cleaning means which include a rotary brush 21A revolving in a suitable cleaning solution 22 followed by a hot air drying device 23.

It will be apparent that such marking may comprise pencil marking, inking means, application of magnetic powder, marking by means of heat, application and removal of adhesive tape or similar means without deviating from the principle of the invention.

Figure 2:
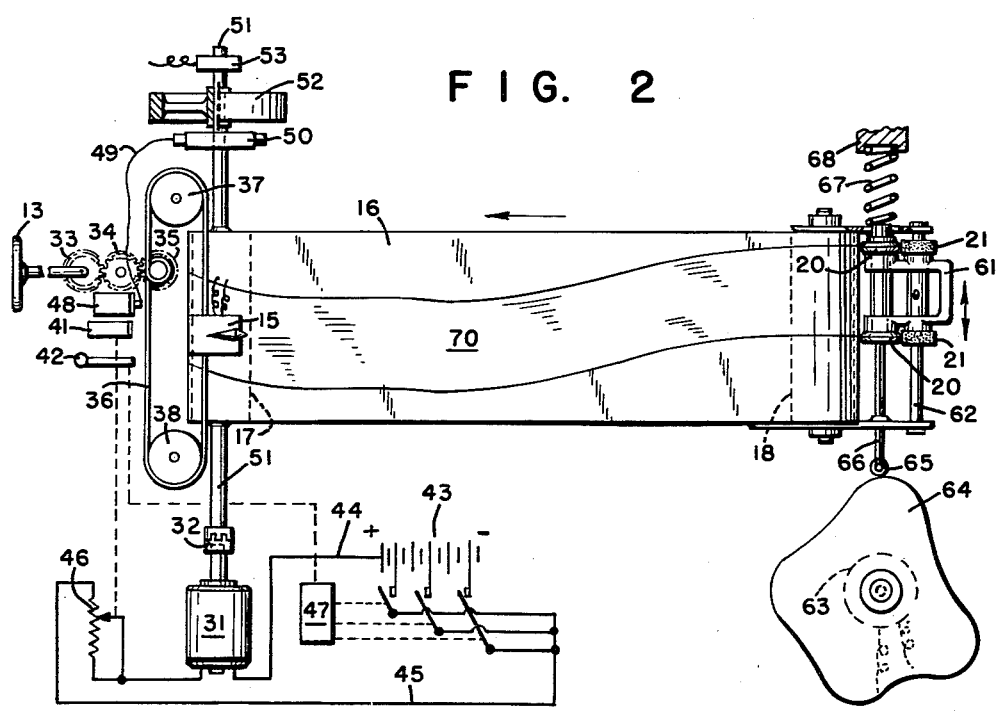
FIGURE 2 is a plan view of the training device illustrating more closely portions of FIGURE 1.

FIGURE 2 illustrates more closely some of the mechanisms and components involved in operating the device per FIGURE 1. Motor 31 drives the road belt via a coupling 32 and roller 17 about which the endless belt 16 rotates. Belt 16 may be made of fabric, impregnated fabric, plastic material, so that the belt is readily flexible as well as capable of being marked repetitively with road boundaries. The steering wheel 13 via a set of suitable gears 33, 34, and 35 drives a flexible cable 36 which is fastened around the side of gear 35. The flexible cable 36 after being guided about pulleys 37 and 38 is fastened to object 15 so that motion of steering wheel 13 causes a corresponding lateral or transverse motion of object 15 relative to the belt 16.

The speed of driving motor 31 is influenced by the accelerator pedal 41 and gear shift lever 42. Motor 31 is driven from a source of electric energy 43 via conductor 44, a series of toggle switches in parallel, conductor 45 and via adjustable resistor 46. The three switches shown represent first, second and third gear shift position on an automobile and it will be understood that one switch at a time is closed. The switches are actuated by gear shift lever 42 engaging a suitable cam device 47 which in turn closes one of the three toggle switches. It will be seen that the switches, from left to right, pick up increasing voltage so that maximum voltage represents the highest speed gear in an automobile. Rheostat 46 is controlled by the accelerator pedal 41 to simulate the action of the gas pedal in an automobile. It will be apparent that the rheostat 46 may be a shaped function potentiometer to simulate actual characteristics of an engine. For the sake of simplicity the clutch pedal is not shown but it readily can be coupled to cam means 47. It will be apparent to those skilled in the art that as an alternate design actual mechanical gear ratios and gear shifting means may be employed which are coupled between the motor and the roller 17 without departing from the principle shown.

The brake pedal 48 via flexible cable 49 controls a brake disk and brake shoe arrangement 50 operatively coupled to drive shaft 51 so that operation of brake pedal 48 causes a braking action on drive shaft 51 which is driven by motor 31. Drive shaft 51 still further is provided with an inertia means, flywheel 52, in order that the belt cannot be slowed or accelerated suddenly, but that the motion of the road belt relative to the object 15 is provided with suitable inertia which represents the dynamic characteristics of a moving vehicle. Moreover, an inertia switch 53 in a similar manner is fastened to the drive shaft 51, this inertia switch causing an electrical circuit contact operation during sudden mechanical acceleration or deceleration of the shaft 51. This contact operation is used for scoring purposes to indicate whether sudden acceleration or deceleration due to improper operation of the driving controls has occurred. Switches of this type are well known in the art in conjunction with measuring of acceleration or deceleration and need not be described in further detail.

It will be apparent to those skilled in the art that the adjustment of the brake shoe and brake disk may be made subject to wide variation to simulate varying road conditions. A device of this type may include spring means and clutch facing depending upon the road conditions to be simulated. In this manner, the friction may be changed to simulate conditions involving dry roads to those involving wet roads and icy conditions.

The road marking device involving the establishing of lateral boundaries will be apparent by referring to the following details:

The two marking wheels 20 in contact with ink supply wheels 21 are supported in a movable bracket 61 which is adapted to slide laterally along transverse shaft 62. The bracket 61 is driven along its lateral excursion by means of a motor 63 coupled to an irregularly shaped cam 64 via cam follower 65 and push rod 66. The marking wheels and bracket are resiliently biased toward the cam by spring 67 which is confined between reference point 68 and the bracket 61.

As the motor 63 rotates cam 64, the bracket 61 with marking wheels is in oscillatory motion and causes a pair of lateral boundary marks on belt 16 thereby providing a road 70 defined between the markings. It will be apparent that depending upon the contours of the cam 64, the marked road can be changed from a simple straight road to a continuously curved road and that by changing the distance between the marking wheels, the road may be wide or narrow. Moreover, it will be observed that the road pattern is changing continuously and that if the cam contour is of sufficient length with respect to the linear length of the belt, the pattern is changing without establishing a repetitive pattern during a single revolution of the belt. If cam 64 is driven at a slow rate the problem presented to the trainee, having to confine object 15 within the lateral boundaries of the road, will be less difficult than when driving cam 64 at a high speed in which case the resultant road pattern will be changing more rapidly. When it is desired to repeat a certain road pattern in a repetitive manner, for instance for the initial phases of training or when simulating a short difficult road, it is obvious that the marking device may be disabled by lifting it away from the belt so that the pattern established on the belt will remain. In this event, it will be necessary to disable also the erasing means comprising brush, bath and blower means 21, 22, and 23 respectively of FIGURE 1. By providing a third marking wheel, disposed between the marking rollers 20 shown, a center-line of the road is achieved.

Figure 3:
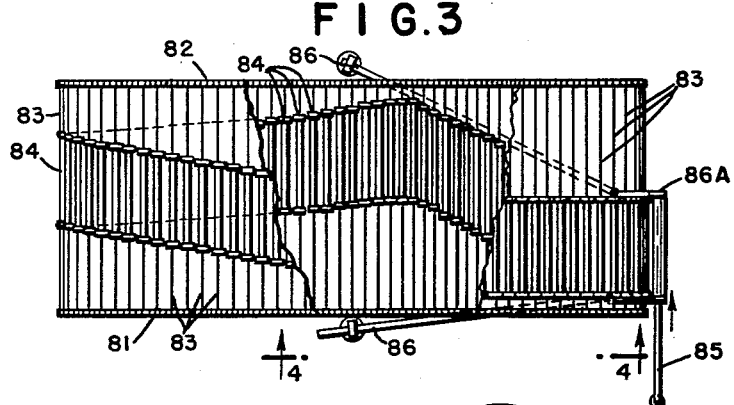
FIGURE 3 is a plan view of an alternate design for the terrain means.
Figure 4:
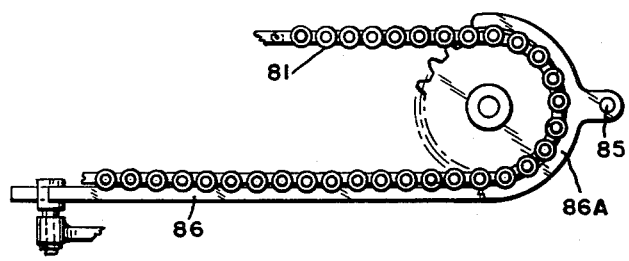
FIGURE 4 is a side view at line 4 of FIGURE 3.

FIGURES 3 and 4 illustrate an alternate design for the terrain means which are presented to the trainee position. Instead of using a continuous belt of fabric or plastic material, the terrain means comprise a grating formed by a series of transverse elements in parallel alignment with respect to one another and which may be displaced laterally. This construction is accomplished by providing endless band means such as a set of spaced link chains 81 and 82 which are adapted to retain therebetween a plurality of parallel rods 83. As the chains are driven about respective rollers or sprockets, rods 83 follow, thus establishing essentially a flexible belt comprising a plurality of parallel rods. Each rod is equipped with a shorter tubing 84 which is adapted to slide along the longitudinal axis of the associated rod. These tubular elements therefore are capable of transverse or lateral motion with respect to the longitudinal axis of the terrain belt.

The terrain means described above incorporate a mechanism for causing the lateral displacement of the tubular members by providing a push rod 85 attached to a U-shaped frame 86A. By arranging push rod 85 so that it is driven by cam 64 (FIGURE 2), a lateral displacement of the tubular elements is obtained. After the terrain has passed the view of the trainee position, guide means 86 are provided which collect the displaced tubular elements and bring the elements into alignment in frame 86A.

Tubular elements 84 may be painted with a distinct color to simulate concrete or macadam roads so as to closely resemble the appearance of actual roadways. Moreover, the ends of the tubing may be provided with upstanding extensions to provide visualization of highway markers, trees, fence posts, telegraph poles, etc. It will be apparent to those skilled in the art that instead of tubular elements colored beads, pins or other markers may be employed without departing from the broad principle of the invention. By using the terrain means described above it will be apparent, that the marking and erasing means shown in FIGURE 1 need not be employed.

Figure 5:
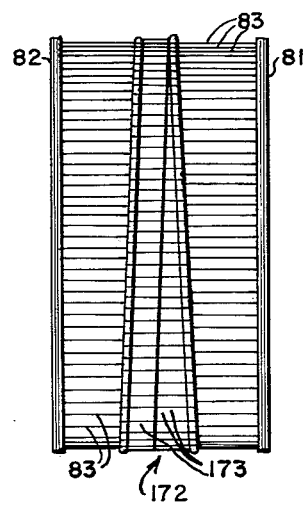
FIGURE 5 is a plan view of terrain means shown in FIGURE 3 and incorporating certain additional features.
Figure 6:
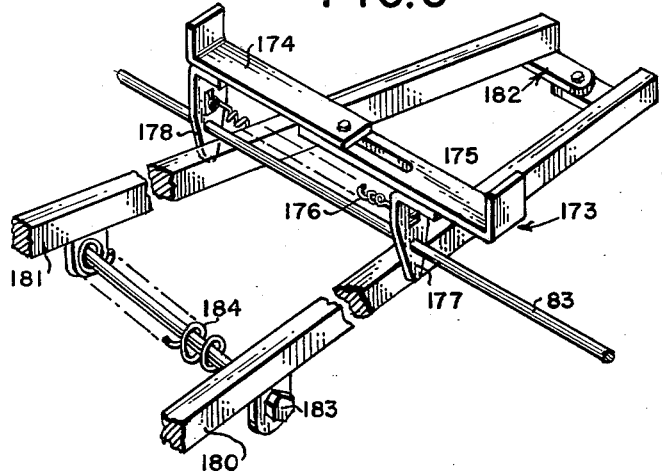
FIGURE 6 is a perspective view of certain details of components indicated schematically in FIGURE 5.

A further improvement of the road pattern, simulating more closely the view seen by a driver driving along a highway which appears to merge into a point at the distant horizon is shown in FIGURES 5 and 6. The road pattern 172 comprises a plurality of transverse elements 173, each element being supported on a transverse rod 83 and these rods being mounted in a set of spaced link chains 81 and 82 respectively, the same as in FIGURE 3.

FIGURE 6 is a perspective view of certain elements within the general arrangement of the road pattern. Each transverse rod 83 which supports the transverse road pattern elements 173 supports a pair of transversely slidable bars or members 174 and 175 which together form the road element 173. Both members, member 174 and 175, are normally held against one another by means of tension spring 176 which is attached to brackets 177 and 178 respectively, each of these brackets being mounted to one of the members. The laterally slidable members 174 and 175 may be spread apart by means of guide means, such as longitudinal bars 180 and 181 which are joined together at pivot point 182, thereby forming a bifurcated mechanism. It will be noted that longitudinal bar 180 is in contact with bracket 177 and longitudinal bar 181 in contact with bracket 178. As the terrain means move toward the view of the trainee position, each of the terrain elements 173 comprising members 174 and 175 is spread apart to produce the pattern illustrated in FIGURE 5. The amount of spreading, produced by the distance between bars 180 and 181, may be adjusted by means of screw means 183 which serves to change the working space available for helical spring 184, the latter holding the bars in their spread position.

It will be apparent that the entire road arrangement may be shifted laterally to produce curves as illustrated in FIGURE 3 and that the individual transverse elements at their extreme lateral end may be shaped in any suitable manner to suit the conditions simulated.

While there have been shown certain specific features and embodiments of the present invention it will be apparent to those skilled in the art that various further and other modifications may be made therein without departing from the spirit and intent of the instant invention which shall be limited only by the scope of the appended claims.

What is claimed is:

1. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of parallel transverse elements; each of said elements fastened to endless band means; a set of rollers disposed for supporting said band means; motive means for rotating said band means about said rollers whereby to cause said elements to advance toward said object as viewed from said trainee position; each of said transverse elements provided with a further element which is laterally displaceable on the associated transverse element whereby said further element is adapted to demarcate the boundaries of a path within which the object is to be confined by means of said controls; means for selectively displacing said further elements relative to the associated transverse elements, and said means displacing said further elements being operated in response to the operation of said motive means.

2. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of parallel transverse elements; each of said elements fastened to endless band means; a set of rollers disposed for supporting said band means; motive means attached to at least one of said rollers for rotating said band means about said rollers whereby to cause said elements to advance toward said object as viewed from said trainee position, the speed of said band means being responsive to the controls at said trainee position; each of said transverse elements provided with a further element which is laterally displaceable on the associated transverse element whereby said further element is adapted to demarcate the boundaries of a path within which the object is to be confined by means of said controls; means for selectively displacing said further elements laterally relative to said associated transverse elements, and said means displacing said further elements being operated in response to the speed of said motive means.

3. A training device comprising: a trainee position; controls for operation by a trainee disposed at said position; an elongated terrain means visible at the trainee position; means supporting an object above said terrain means and in view of said trainee position; means for causing said terrain means and object to be movable laterally relative to one another in response to the controls at said trainee position; said terrain means comprising a grating which includes a plurality of parallel transverse elements; each of said elements fastened to endless band means; a set of rollers disposed for supporting said band means; motive means attached to at least one of said rollers for rotating said band means about said rollers whereby to cause said elements to advance toward said object as viewed from said trainee position and the speed of said band means being responsive to the controls at said trainee position; each of said transverse elements provided with a further element which is displaceable along the length of the associated transverse element whereby said further element is adapted to demarcate the lateral boundary of a path within which the object is to be confined by means of said controls; guide means adapted to engage and selectively displace said further elements laterally relative to said associated transverse elements; means for moving said guide means to cause variable lateral displacement of said further elements before said elements pass the position at which said object is disposed; said means moving said guide means being operated in response to the operation of said motive means, and means for realigning displaced further elements after said elements have passed the position of said object.

4. A training device comprising: a trainee position; controls for operation by a trainee disposed at said position; an elongated terrain means visible at the trainee position; means supporting an object above said terrain means and in view of said trainee position; means for causing said terrain means and object to be movable laterally relative to one another in response to the controls at said trainee position; said terrain means comprising a grating which includes a plurality of parallel transverse bars; each of said bars fastened to endless band means; a set of rollers disposed for supporting said band means; motive means attached to at least one of said rollers for rotating said band means about said rollers whereby to cause said bars to advance toward said object as viewed from said trainee position and the speed of said band means being responsive to the controls at said trainee position; each of said transverse bars provided with a tubing which is displaceable along the length of the associated transverse bar whereby said tubing is adapted to demarcate the lateral boundary of a path within which the object is to be confined by means of said controls; guide means adapted to engage and selectively displace said tubings laterally relative to said associated transverse bars; means for moving said guide means to cause variable lateral displacement of said tubings before the respective bars pass underneath said object; said means moving said guide means being operated in response to the speed of said motive means, and means for realigning displaced tubings for being received by said guide means after said bars have passed underneath said object.

5. A training device comprising: a trainee position; controls for operation by a trainee disposed at said position; an elongated terrain means visible at the trainee position; means supporting an object above said terrain means and in view of said trainee position; means for causing said terrain means and object to be movable laterally relative to one another in response to the controls at said trainee position; said terrain means comprising a grating which includes a plurality of parallel transverse bars; each of said bars fastened to a set of spaced endless chains; a set of spaced apart sprockets disposed for supporting said chains; motive means coupled to at least one of said sprockets for rotating said chains about said sprockets whereby to cause said bars to advance toward said object and pass underneath thereof as viewed from said trainee position, the speed of said chains being responsive to the controls at said trainee position; each of said transverse bars provided with a tubing which is displaceable along the length of the associated transverse bar; said tubing being constructed to demarcate the lateral boundary of a path within which the object is to be confined by means of said controls; laterally settable guide means adapted to engage and selectively displace said tubings laterally relative to the associated transverse bars; cam means adapted to be coupled to said guide means to cause lateral displacement of said tubings before the respective bars pass underneath said object; said cam means being connected to said motive means and driven in response to the speed thereof, and means for realigning displaced tubings subsequent to the bars having passed underneath said object.

6. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of transverse elements; each of said elements fastened to endless band means; a set of rollers disposed for supporting said band means; driving means for rotating said band means about said rollers whereby to cause said elements to advance toward said object as viewed from said trainee position; each transverse element comprising a set of bars adjustably positionable relative to one another for varying the distance between the opposite ends of said bars along the lateral dimension of said terrain means; the opposite ends of said bars defining the lateral boundary of a path within which said object is to be confined by means of the controls at said trainee position; guide means disposed for engaging said bars as said elements advance toward said object, and said guide means adapted to selectively adjust the distance between said opposite ends as each element moves relative to said guide means in response to the operation of said driving means.

7. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of transverse elements; each of said elements fastened to endless band means; a set of rollers disposed for supporting said band means; driving means attached to at least one of said rollers for rotating said band means about said rollers whereby to cause said elements to advance toward said object as viewed from said trainee position; each transverse element comprising a pair of bars slidably positionable relative to one another for varying the distance between the opposite ends of said bars along the lateral dimension of said terrain means; the opposite ends of said bars defining the lateral boundary of a path within which the object is to be confined by means of the controls at said trainee position; guide means disposed for engaging said bars as said elements advance toward said object and pass the position of said object, and said guide means adapted to selectively spread said bars whereby to adjust the distance between said opposite ends as each element moves relative to said guide means in response to the operation of said driving means.

8. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of transverse elements; each of said elements fastened to endless band means; a set of rollers disposed for supporting said band means; driving means attached to at least one of said rollers for rotating said band means about said rollers whereby to cause said elements to advance toward said object as viewed from said trainee position; said driving means being operable in response to the controls at said trainee position; each transverse element comprising a pair of bars slidably positionable relative to one another for varying the distance between the opposite ends of said bars along the lateral dimension of said terrain means; the opposite ends of said bars demarcating the lateral boundary of a path within which the object is to be confined by means of the controls at said trainee position; adjustable guide means disposed for engaging said bars as said elements advance toward said object and pass the position of said object; said guide means adapted to selectively spread said bars whereby to adjust said distance as each element moves relative to said guide means in response to the operation of said driving means; means for adjusting said guide means to cause the distance between opposite ends of a respective pair of bars which is disposed in proximity to the position of the object to be greater than the respective distance of a respective pair of bars farther removed from the object as seen from said trainee station along said terrain means, whereby to simulate the optical illusion of parallel lateral boundaries meeting at a distant horizon.

9. A training device comprising: a trainee position; controls for operation by a trainee disposed at said position; an object in view at said trainee position; an elongated terrain means visible at the trainee position with said object being disposed above said terrain means; means for causing said terrain means and object to be movable laterally relative to one another in response to the controls at said trainee position; said terrain means comprising a grating which includes a plurality of transverse elements; each of said elements fastened to endless band means; a set of rollers disposed for supporting said band means; driving means operative upon said band means for rotating said band means about said rollers whereby to cause said elements to advance toward said object as viewed from said trainee position, said driving mean being operable in response to the controls at said trainee position; each transverse element comprising a pair of bars slidably positionable relative to one another for varying the distance between the opposite extreme ends of said bars along the lateral dimension of said terrain means; said ends of said bars demarcating the lateral boundary of a path within which the object is to be confined by means of the controls at said trainee position; adjustable guide means disposed at a position in front of said object along the length of travel of said terrain means; said guide means engaging said bars as said elements advance toward said object and pass the position of said object, and selectively spread said bars whereby to adjust the distance between respective extreme ends of said bars as each element moves relative to said guide means in response to the operation of said driving means; means for adjusting said guide means to cause the distance between opposite ends of bars to be adjusted in relation to their proximity to said object whereby to cause the distance of a respective pair of bars to increase as the pair advances toward the position of said object in response to the operation of said driving means, said terrain means when viewed from said trainee position simulating the optical illusion of parallel lateral boundaries meeting at a distant horizon.

10. A training device as set forth in claim 9 wherein resilient bias means are provided for urging each respective pair of bars toward one another and said guide means spreading said bars comprise a set of longitudinal bars whose separation is adjustable.

11. A training device comprising: a trainee position; controls for operation by a trainee disposed at said position; an object in view at said trainee position; an elongated terrain means visible at said trainee position with said object being disposed above said terrain means; means for causing said terrain means and object to be movable laterally relative to one another in response to the controls at said trainee position; said terrain means comprising a set of spaced endless chains and a plurality of transverse rods in parallel alignment with respect to one another supported by said chains to form a grating; a set of sprockets disposed for supporting said chains; driving means operative upon said chains for rotating said chains about said sprockets whereby to cause said rods to advance toward said object as viewed from said trainee position; said driving means being operable in response to controls at said trainee position; each transverse rod supporting a pair of bars which are adapted to be selectively positionable along the longitudinal axis of the associated bar whereby the distance between the opposite extreme ends of each pair of bars is variable for defining the width of a path within which said object is to be confined by means of the controls at said trainee position; a tab extending from each of said bars; adjustable guide means disposed at a position in front of said object along the length of travel of said bars; said guide means adapted to engage each of said tabs for adjusting the distance between said opposite ends of said bars as each pair of bars moves relative to said guide means toward said object in response to the operation of said driving means; means for adjusting said guide means to cause the distance between opposite ends of bars to be adjusted in relation to their proximity to said object whereby to cause the distance of a respective pair of bars to increase as the respective pair advances toward said object, said terrain means when viewed from said trainee position simulating the optical illusion of parallel lateral boundaries meeting at a distant horizon.

References Cited in the file of this patent

UNITED STATES PATENTS

| | | |
|---|---|---|
| 736,901 | Willson | Aug. 18, 1903 |
| 1,768,482 | Koch | June 24, 1930 |
| 2,493,942 | Bingham | Jan. 10, 1950 |
| 2,742,714 | Allgaier | Apr. 24, 1956 |